April 17, 1956     A. SERNA     2,742,584
NON-COMMUTATING NON-UNIPOLAR DIRECT CURRENT GENERATOR
Filed May 18, 1953     2 Sheets-Sheet 1
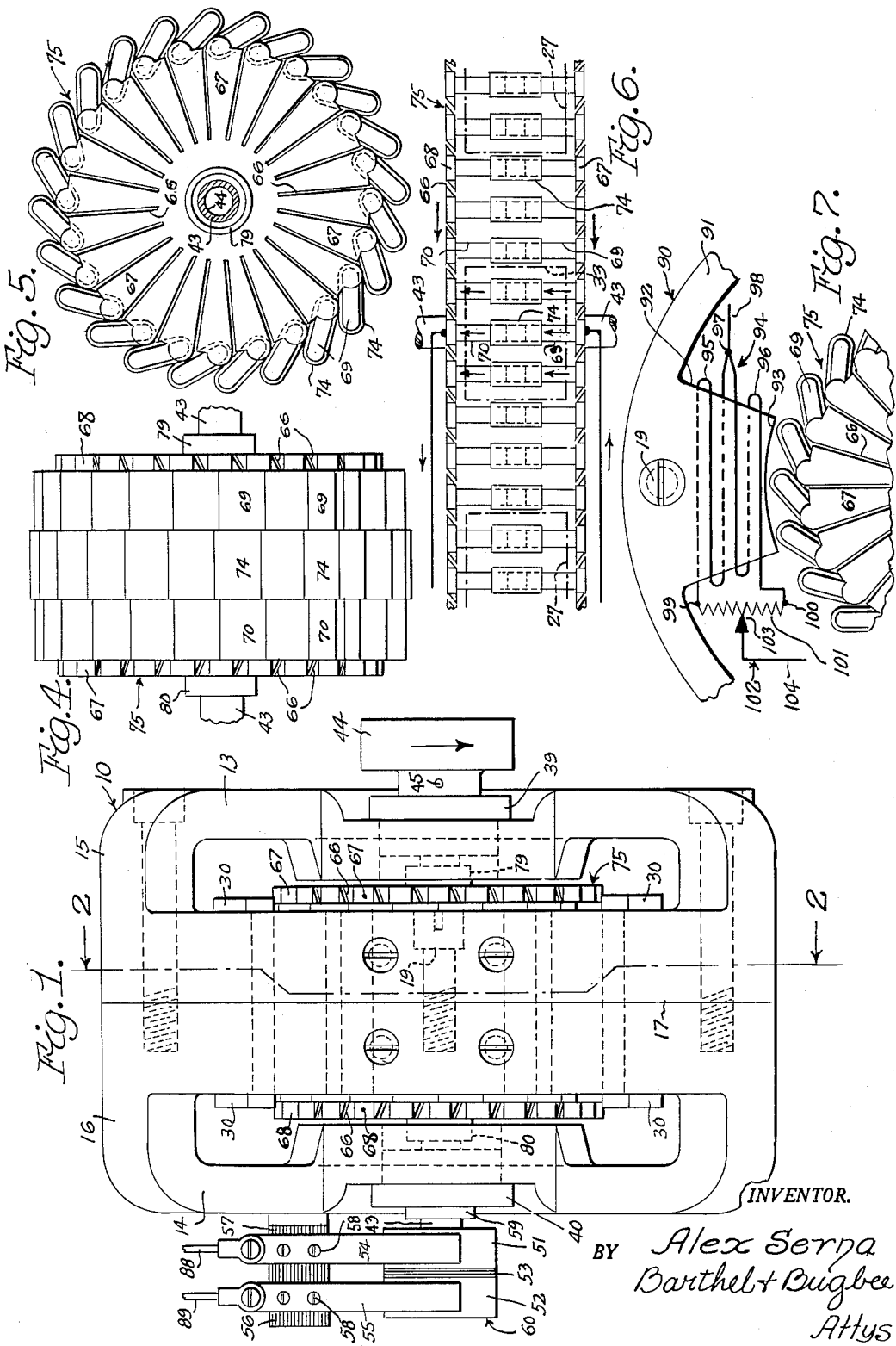
INVENTOR.
BY Alex Serna
Barthel + Bugbee
Attys April 17, 1956
A. SERNA
2,742,584
NON-COMMUTATING NON-UNIPOLAR DIRECT CURRENT GENERATOR
Filed May 18, 1953
2 Sheets-Sheet 2
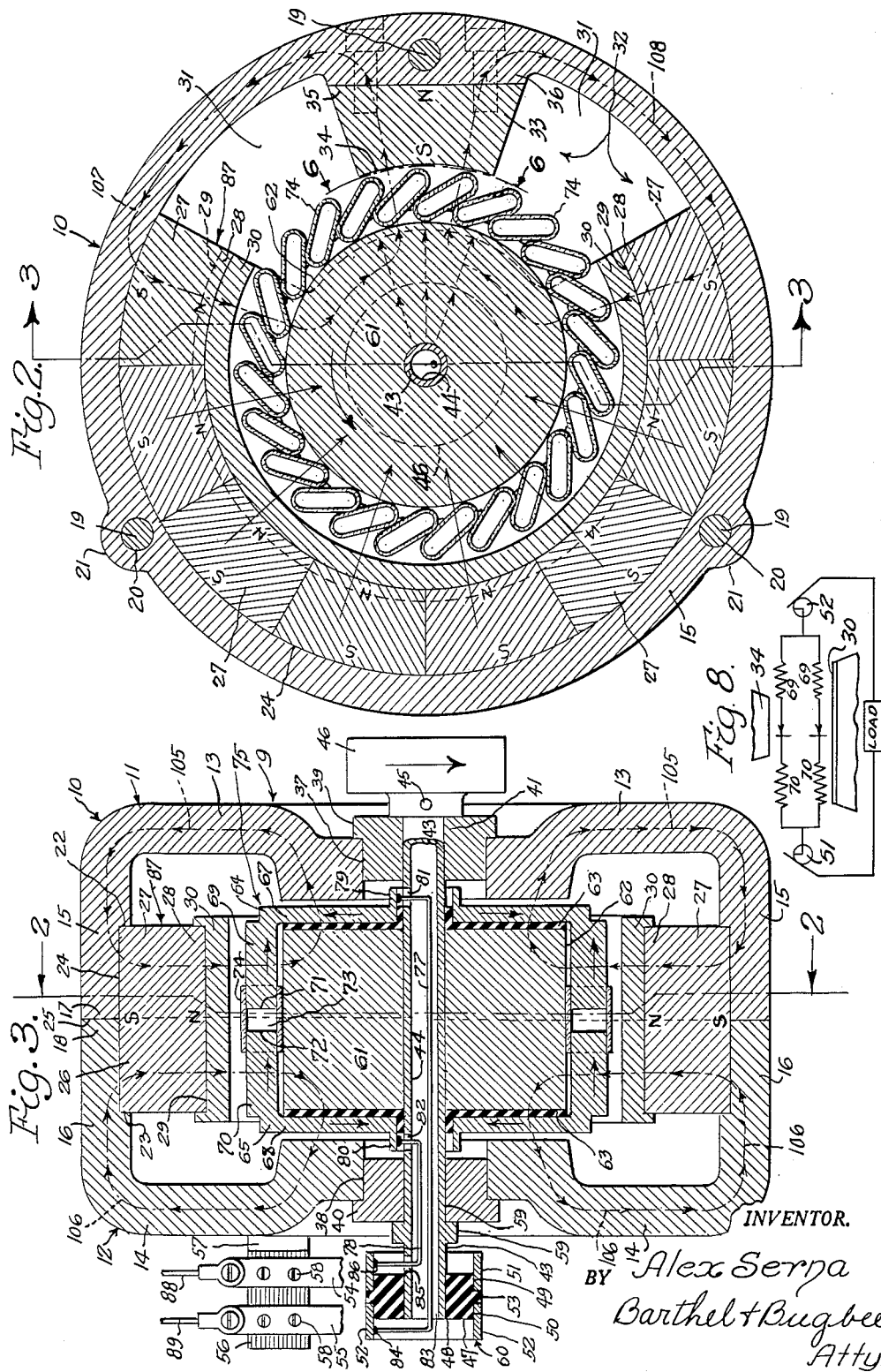
INVENTOR.
Alex Serna
BY Barthel + Bugbee
Attys United States Patent Office 2,742,584
Patented Apr. 17, 1956

2,742,584
NON-COMMUTATING NON-UNIPOLAR DIRECT CURRENT GENERATOR

Alex Serna, Dearborn, Mich.

Application May 18, 1953, Serial No. 355,688

12 Claims. (Cl. 310—177)

This invention relates to dynamoelectric machines, such as electric dynamos or motors.

One object of this invention is to provide a dynamo-electric machine wherein electric current is generated by rotating a rotor in a magnetic field, the rotor including a pair of radially-slotted discs interconnected by an approximately cylindrical rim having gaps containing an ionizable gas, the current generated in the slotted discs by the rotation thereof being caused to flow across each gap or portion thereof when that gap arrives adjacent a field magnet pole piece of reversed polarity, the thus-generated current being taken off by collector rings and brushes on the rotor shaft.

Another object is to provide a dynamoelectric machine of the foregoing character wherein the rim of the rotor contains multiple individual gaps spaced circumferentially around the periphery of the rotor and enclosed in suitable containers for the ionizable gas, the gaps eliminating the brushes otherwise required for engagement with the discs so as to take off the generated current at the disc peripheries.

Another object is to provide a dynamoelectric machine of the foregoing character, wherein the rotor discs, in addition to being slotted radially, are also slotted axially at the periphery but in oblique directions relatively to the axis of the rotor so as to provide overlap of the peripheral portion of the sectors or radial arms formed by the radial slots, thereby separating the current generated in one set of radial arms from that generated in the adjacent sets while preventing discontinuity of magnetic flux across the oblique slot between the peripheries of adjacent arms or sectors of the rotor discs.

Another object is to provide a dynamoelectric machine of the foregoing character which eliminates the use of brushes at the periphery of the rotor for collecting current generated therein or for supplying current thereto when used as a motor.

Other objects and advantages of the invention will become apparent during the course of the following description of the accompanying drawings, wherein:

Figure 1 is a side elevation of a dynamoelectric machine according to one form of the invention;

Figure 2 is a central vertical cross-section taken along the lines 2—2 in Figures 1 and 3;

Figure 3 is a central vertical longitudinal section taken along the line 3—3 in Figure 2;

Figure 4 is a side elevation of the rotor of the machine shown in Figures 1, 2 and 3, as removed from the machine;

Figure 5 is an end elevation, partly in section, of the rotor shown in Figure 4;

Figure 6 is a diagrammatic developed side elevation of the current flow paths in the rotor of the machine of Figures 1 to 5 inclusive, taken along the line 6—6 in Figure 2, with the large arrows showing the direction of rotation of the rotor and the small arrows showing the direction of flow of the current generated therein adjacent the reversed-polarity pole piece of the field magnet structure;

Figure 7 is a fragmentary side elevation of a modified dynamoelectric machine employing a separately excited reversed-polarity pole piece instead of one which is permanently magnetized; and Figure 8 is a diagrammatic view of a further modified dynamoelectric machine employing a solid rectifying material in the gaps between the ends of the rotor electrodes.

The generation of electric current by rotating an electrically-conducting disc in a magnetic field has long been a well-known phenomenon in electro-magnetism. Hitherto, this current so generated has been taken off by brushes engaging the peripheries of the discs and necessarily located in fixed locations because motion of the brushes causes opposing currents to be set up in the discs in a manner cancelling out one another and thereby terminating the flow of current generated. This phenomenon has remained more of a laboratory curiosity than a commercially important effect because insuperable mechanical difficulties have arisen in constructing a practical dynamoelectric machine embodying that principle.

The dynamoelectric machine of the present invention, however, eliminates the need for providing brushes in engagement with the discs, current flow being caused by radially-slotting a pair of axially-spaced discs and interconnecting their peripheral segments by pairs of conductors disposed parallel to the axis and separated by gaps in which an ionizing gas is located, the current generated in the sectors of the slotted discs being caused to flow when each gap arrives adjacent an isolated magnetic field pole piece of reversed polarity relatively to the remaining field magnet structure, the currents induced in the sectors or arms of the rotor discs momentarily located remote from the reversed polarity pole piece being ineffectual by cancelling out one another because of their opposing natures. The rotor discs in addition to being radially slotted are also slotted obliquely relatively to the axis of rotation so as to provide overlap of magnetic flux without permitting corresponding flow of current across the slots, thereby preventing discontinuity of generated electric current.

Referring to the drawings in detail, Figures 1 to 3 inclusive show a dynamoelectric machine, generally designated 9, constructed according to one form of the invention and described in the manner in which it is employed as a mechanically-driven dynamo. The machine 9, however, may be used as a motor by supplying current to the brushes which engage the collector rings. The machine 9 is provided with a casing or housing, generally designated 10, consisting of a pair of dished casing halves 11 and 12 with end plate portions 13 and 14 and rim or peripheral portions 15 and 16 (Figure 3) having their adjacent edges 17 and 18 held in engagement with one another by bolts 19 passing through holes 20 in peripheral bosses 21 (Figure 2). The casing halves 11 and 12 are preferably formed from soft iron and are provided with adjacent annular recesses or rabbets 22 and 23 which in assembly form a partly annular internal groove 24 disposed on opposite sides of the parting line or plane 25 between the two edges 17 and 18 of the casing halves 11 and 12.

Mounted in the partially annular groove 24 in side-by-side abutting relationship are the arcuate outer ends 26 of truncated sector-shaped permanent field magnets 27, the arcuate inner ends 28 of which engage an arcuate or partly annular groove 29 in an arcuate partly annular inner retaining member or interrupted circular ring 30. The permanent field magnets 27 extend only partly around the inner circumference of the rim portions 15 and 16 of the casing halves 11 and 12, leaving a pair of gaps 31 between the endmost magnets 27 and an isolated field magnet or pole 33 which, with the permanent field magnets 27, forms an interrupted-circle field magnet structure, generally designated 32. In the form of the invention shown in Figures 1 to 3 inclusive, the isolated field magnet 33 is permanently magnetic, and of the same general shape as the permanent field magnets 27, but of opposite polarity relatively thereto. The permanet field magnets 27 are of such a character that their outer ends 26 are all of one polarity and their inner ends 28 all of the opposite polarity whereas the isolated field magnet 33 at its arcuate inner end 34 has an opposite polarity to the inner ends 28 of the permanent field magnets 27. The isolated pole 33 may be integral with one or both of the casing halves 11 and 12 or it may be formed separately and be bolted or otherwise secured at its rearward or outer end 35 to a boss or bosses 36 formed on one or both of the peripheral portions 15 and 16 of the casing halves 11 and 12.

The casing halves 11 and 12 at the centers of the end plate portions 13 and 14 are provided with aligned bearing bores 37 and 38 respectively (Figure 3) which receive bearing bushings 39 and 40 having aligned bearing bores 41 and 42 respectively. Journaled in the bearing bores 41 and 42 is a hollow shaft 43 having a longitudinal bore or internal passageway 44 extending through the major portion thereof. Pinned or otherwise secured as at 45 to one end of the hollow shaft 43 is a pulley 46 adapted to receive and be engaged by a belt (not shown), whereas mounted on and drivingly secured to the opposite end thereof is a disc or collar 47 of insulating material having a bore 48 in the center thereof receiving the shaft 43. The periphery of the disc or collar 47 is grooved or rabbeted as at 49 and 50 to receive a pair of collecting rings 51 and 52 of electrically-conducting material, such as copper or brass. The rings 51 and 52 are separated from one another by the annular ridge 53 of insulating material disposed in the gap between them. The collecting rings 51 and 52 are engaged by conventional brushes 54 and 55 mounted on the insulated portion 56 of a bracket 57 secured to the casing half 12, the brushes 54 and 55 being bolted to the insulated portion 56 by screws 58 (Figure 3). The shaft 43 is provided with an annular enlargement 59 adjacent the end thereof provided with the collector rings 51 and 52 and insulating collar or disc 47 which together make up the current collector, generally designated 60.

Mounted on and bored to drivingly receive the central portion of the shaft 43 in the space between the end plate portions 13 and 14 of the casing halves 11 and 12 is a drum or rotor core 61 of soft iron or other suitable magnetic material and provided with a cylindrical peripheral surface 62. Engaging the opposite ends of the drum 61 and mounted on the shaft 43 are centrally-flanged insulating discs 63 of electrically-insulating material. Mounted on the centrally-flanged insulating discs 63 in engagement with the latter are centrally flanged cupped rotor halves 64 and 65 of electrically-conducting material, such as copper.

The cupped rotor halves 64 and 65 are slotted radially as at 66 to provide circumferentially-spaced radial arms or sectors 67 and 68, the slots 66 being angled obliquely to the axis of the drum 61 (Figures 1 and 4) in order to provide continuity or overlap of magnetic flux while providing discontinuity for isolation of current flow. The arms or sectors 67 and 68 at their outer ends are provided with a multiplicity of pairs of aligned circumferentially-spaced rod-like electrodes 69 and 70 extending toward one another paraxially, i. e. parallel to the axis of rotation of the rotor halves but having their inner ends 71 and 72 separated from one another by gaps 73. For brevity, therefore, these electrodes 69 and 70 will be described as aligned paraxial electrodes. Each gap 73 and the adjacent ends 71 and 72 of each pair of electrodes 69 and 70 are enclosed in a short tube 74 of insulating material extending over the ends of the electrodes 69 and 70 and filled with an ionizable gas such as argon, neon, krypton, xenon, hydrogen or the like. The electrodes 69 and 70 and tubes 74 are preferably of elongated cross-section (Figures 2 and 5), the median planes of which are inclined relatively to the radial slots 66.

The rotor, generally designated 75, made up of the drum 61, cupped halves 67, 68, and their component parts including the tubes 74, is rotated by power applied to the pulley 46, the current generated being taken off by conductors 77 and 78 leading from the centrally-flanged portions 79 and 80 of the rotor halves 64 and 65 through holes 81 and 82 in the hollow shaft 43 and thence through the bore 44 thereof. The conductor 77 passes out through the end opening 83 of the passageway or bore 44 to a connection 84 with the collector ring 52. The conductor 78, on the other hand, passes outward through a hole 85 in the hollow shaft 43 to a connection 86 with the collector ring 51 (Figure 3). The arcuate assembly of the permanent field magnets 27 is generally designated as the field or field magnet structure 87. Conductors 88 and 89 convey the current received at the brushes 54 and 55 to the point of utilization.

The modified dynamoelectric machine, generally designated 90, shown in Figure 7 has a rotor 75 identical with the rotor 75 of Figures 1 to 5 inclusive, and similarly mounted in a housing 91 of similar though not identical construction to the housing 10. The housing 91, in place of having the permanently-magnetic reversed-polarity isolated field magnet 33 of Figure 2, is provided with a separately-excited isolated reversed-polarity field magnet 92 preferably of soft iron like the remainder of the housing 91 and conveniently made integral therewith. The isolated field magnet 92 has an arcuate inner end 93 concentric with the axis of rotation of the rotor 75.

The isolated field magnet 92 is provided with a winding, generally designated 94, by which it is magnetized. The winding 94 consists of oppositely-arranged windings 95 and 96 tapped at the junction of their midportions 97 by a conductor 98 and tapped and interconnected at their outer ends 99 and 100 by a resistance 101. The latter forms the resistance coil of a rheostat, generally designated 102, having a slider or other resistance selector 103 by which different portions of the windings 95 or 96 may be selected and placed in circuit so as to vary the intensity of the current flowing through the windings 95 and 96 in order to vary the intensity of the magnetic field adjacent the isolated field magnet 92 or to reverse the polarity of that field magnet. The selector 103 is connected to a conductor 104 and the conductors 97 and 104 are in turn connected to an external source of electric current for energizing the windings 95 and 96 and consequently exciting the isolated reversed polarity field magnet or pole 92.

In the operation of dynamoelectric machines 9 or 90 as a dynamo, power is applied to the driving pulley 46 (Figures 1 and 3) as by a belt which in turn is driven by any suitable prime mover, such as a steam engine, internal combustion engine, gas or steam turbine, or water wheel or water turbine, and, in the case of the modified machine 90 of Figure 7, current is also supplied to the isolated field magnet winding 94 through the conductors 97 and 104. Assuming that the rotor 75 is rotated in a direction indicated by the arcuate arrow (Figure 2), and also assuming that the magnetic lines of force extend radially inward as shown by the radial arrows in Figure 2, the consequent cutting of these lines of magnetic force by the rotor arms 67, 68 and their electrodes 69, 70 causes electric currents to flow therein. These currents, however, are of opposing natures, as indicated by the oppositely proceeding arrows (Figure 3) and cancel one another out except at the isolated field pole 33 or 92 of reversed polarity. At this location (Figures 2 and 7), the opposing effects are eliminated and the current flows through the electrodes 69 and 70 and across the gaps 73 between their separated ends 71 and 72, conducted by the ionized gas in the tubes 74. The current thus generated in the rotor 75 is conveyed to the collecting rings 51, 52 of the current collector 60 by the conductors 77 and 78 and is thence distributed through the conductors 88 and 89 to the point of utilization of the current. The slots 66 reduce the formation of eddy currents in the portions 67, 68 of the rotor halves 64, 65.

The magnetic flux proceeding in the orbital paths shown by the arrows designated 105 and 106 in Figure 3, induces opposing currents in adjacent arms or sectors 67, 68 and their corresponding electrodes 69, 70 whereas adjacent the reversed-polarity isolated field magnet 33 or 92 the magnetic flux, as indicated by the dotted lines and arrows 107 and 108 (Figure 2) is in orbital paths forming a continuous magnetic circuit with radial sides extending through the reversed-polarity field magnet 33 and resulting in the elimination of the opposing effects of current generation at this location, as stated above. The current flow in the rotor 75 adjacent the ends 34 or 93 of the field magnet 33 or 92 is shown diagrammatically in Figure 6.

In either of the forms of the invention, the construction and arrangement of the reversed-polarity isolated field magnet 33 or 92 in the gap 31 between the opposite ends of the arcuate assembly 87 of permanent field magnets 27, in cooperation with the ionizing gas in the electrode gaps 73 within the tube 74, is such that when the rotation of the rotor 75 brings these devices successively in front of the reversed-polarity isolated field magnet 33 or 92, the passage of current from one to the other of the slotted rotor halves 64, 65 is favored. Under such circumstances, the fixed path thus provided for the current is analogous to the mechanical arrangement of a stationary brush engaging the periphery of each rotor half 64 or 65, with such brushes interconnected by a stationary metallic link.

While for simplicity of showing the arcuate field magnet assembly 87 is indicated as composed of permanent magnets 27, it will be understood that electro-magnets provided with windings may optionally be used and energized by electric current flowing through such windings. It will also be evident that it is not indispensable to the successful operation of the machine that the slots 66 in the rotor halves 11, 12 be exactly radial so long as they extend outwardly from the central to the peripheral portions thereof and divide the rotor halves into outwardly-extending circumferentially-spaced arms, not necessarily true geometric sectors. The slots 66 may thus be angled relatively to the radii of the rotor halves 11, 12 or may even be curved outwardly from the central to the peripheral portions thereof. The obliquely-directed slots 66 also by their overlapping arrangement prevent interruption in the flow of the current generated in the rotor. In this respect they obtain the effect of a solid disc, yet prevent the travel of generated current circumferentially within the disc to a point of opposite polarity and thereby prevent the causation of an internal closed circuit with consequent loss of generated current.

The dynamo-electric machine of the present invention has non-cyclic or acyclic characteristics, hence can be used as a variable speed alternating current motor by supplying alternating current thereto and varying the voltage of the alternating current. Because of the acyclic characteristics of the machine, the speed is entirely independent of the frequency of the alternating current supplied. When the modified machine of Figure 7 is used as a direct current dynamo or generator, its output can be controlled or modulated by means of the opposed windings 95, 96 on the isolated field magnet 92.

If unidirectional characteristics are desired in the gap 73 between the ends 71 and 72 of the electrodes 69 and 70 (Figure 3), the modified arrangement shown diagrammatically in Figure 8 may be used. In this arrangement, a solid rectifying material may be used in the gap, such as, for example, germanium, copper-oxide, selenium, or an equivalent material. The ionizable gas used in the gaps 73 (Figure 3) is nonconducting for all voltages generated in the armature conductors 69—70 except those generated in conductors cutting the relatively intense field under pole piece 30.

Thus, the electrodes 69 and 70 and the gap 73 of ionizing gas between them act in a manner analogous to an automatically-operative switch which is normally open to prevent the conduction of electricity, and which closes automatically to conduct electricity only when each pair of these electrodes arrives adjacent the isolated reversed-pole field magnet 33. As the rotor 75 rotates in the manner explained above, the currents generated in the rotor 75 by the cutting of the magnetic lines of force extending between the permanent field magnet 27 and the rotor core 61 are of low voltage because the magnetic field is distributed throughout the extended space comprising the entire arcuate path occupied by the multiple permanent field magnets 27. The gap 73 is chosen of such length and the ionizing gas therein of such character that the voltage thus generated adjacent the multiple permanent field magnets 27 is insufficient to cause the gap 73 to break down and transmit the current thus generated. Accordingly, the currents generated in the arcuate path occupied by the multiple permanent field magnets 27 will not jump the gaps 73 and hence will oppose and cancel out one another as indicated by the arrows in the rotor portions 64 to 70 inclusive in Figure 3.

However, when the particular electrodes 69, 70 and their gap 73 arrive at and pass the end 34 of the isolated reversed pole field magnet 33, the magnetic flux is concentrated and is consequently of high intensity. Accordingly, the current generated at this location is now of sufficiently high voltage to break down the gap 73 between each pair of electrodes 69 and 70 as they pass by the field magnet 33, ionize the gas therein, and cause the current flow across the gap and thence by way of the conductors 77 and 78 and collector rings 51 and 52 to the load in the external circuit. This occurs by reason of its generating a voltage in excess of the breakdown voltage existing across the gaps 73 between the electrodes 69 and 70.

It is of course also necessary that the resistance of the load in the external circuit be less than the resistance to current flow across the gaps 73 while they are traversing the arcuate path adjacent the multiple permanent field magnets 27, otherwise the higher voltage current generated adjacent the isolated reversed-pole field magnet 33 would flow across other gaps 73 not adjacent the isolated field magnet 33 in a parallel-circuit manner. Where, however, these factors are as above stated, the higher voltage current generated at the isolated reversed-pole field magnet 33 will flow to and through the external load circuit since it is of insufficiently high voltage to break down the resistance of the nonadjacent gaps 73 when they are at locations remote from the isolated field magnet 33. Thus, under these conditions, the electrodes 69 and 70 and the ionizable gas gaps 73 will bar the conduction of electricity at all locations except adjacent the isolated reversed-pole magnet 33, yet will permit flow of current at the latter location.

What I claim is:

1. A dynamo-electric machine comprising an interrupted-circle field magnet structure having an arcuate field magnet assembly of one polarity arrangement with its opposite ends spaced apart from one another and having an isolated field magnet of opposite polarity arrangement with respect to said field magnet assembly disposed in the space between the ends thereof, a shaft with a rotor thereon rotatably mounted within said structure with the rotor periphery disposed in proximity thereto and traversing the magnetic field thereof; said rotor having a core of magnetizable material with a pair of rotor halves mounted at opposite ends thereof, each rotor half having a side disc with multiple outwardly-directed circumferentially-spaced slots therein forming multiple circumferentially-spaced outwardly-extending arms, each rotor half having circumferentially-spaced paraxial electrodes extending from the outer ends of said arms toward aligned corresponding electrodes on the other rotor half, the adjacent ends of each pair of aligned electrodes of said rotor halves being separated by a gap, and a uni-directional current flow regulator disposed therein; a pair of current collectors insulatedly mounted on said shaft, each collector being electrically connected to one of said rotor halves, and means engageable with said collectors for conducting electric current to and from said collectors.

2. A dynamo-electric machine comprising an interrupted-circle field magnet structure having an arcuate field magnet assembly of one polarity arrangement with its opposite ends spaced apart from one another and having an isolated field magnet of opposite polarity arrangement with respect to said field magnet assembly disposed in the space between the ends thereof, a shaft with a rotor thereon rotatably mounted within said structure with the rotor periphery disposed in proximity thereto and traversing the magnetic field thereof; said rotor having a core of magnetizable material with a pair of rotor halves of cupped configuration mounted at opposite ends thereof, each rotor half having a side disc with multiple outwardly-directed circumferentially-spaced slots therein forming multiple circumferentially-spaced outwardly-extending arms, each rotor half having circumferentially-spaced paraxial electrodes extending from the outer ends of said arms toward aligned corresponding electrodes on the other rotor half, the adjacent ends of each pair of aligned electrodes of said rotor halves being separated by a gap, and a uni-directional current flow regulator disposed therein; a pair of current collectors insulatedly mounted on said shaft, each collector being electrically connected to one of said rotor halves, and means engageable with said collectors for conducting electric current to and from said collectors.

3. A dynamo-electric machine comprising an interrupted-circle field magnet structure having an arcuate field magnet assembly of one polarity arrangement with its opposite ends spaced apart from one another and having an isolated field magnet of opposite polarity arrangement with respect to said field magnet assembly disposed in the space between the ends thereof, a shaft with a rotor thereon rotatably mounted within said structure with the rotor periphery disposed in proximity thereto and traversing the magnetic field thereof; said rotor having a core of magnetizable material with a pair of rotor halves mounted at opposite ends thereof, each rotor half having a side disc with multiple outwardly-directed circumferentially-spaced slots therein forming multiple circumferentially-spaced outwardly-extending arms, each rotor half having circumferentially-spaced paraxial electrodes extending from the outer ends of said arms toward aligned corresponding electrodes on the other rotor half, the adjacent ends of each pair of aligned electrodes of said rotor halves being separated by a gap, and a uni-directional current flow regulator comprising an ionizable gas disposed therein; a pair of current collectors insulatedly mounted on said shaft, each collector being electrically connected to one of said rotor halves, and means engageable with said collectors for conducting electric current to and from said collectors.

4. A dynamo-electric machine comprising an interrupted-circle field magnet structure having an arcuate field magnet assembly of one polarity arrangement with its opposite ends spaced apart from one another and having an isolated field magnet of opposite polarity arrangement with respect to said field magnet assembly disposed in the space between the ends thereof, a shaft with a rotor thereon rotatably mounted within said structure with the rotor periphery disposed in proximity thereto and traversing the magnetic field thereof; said rotor having a core of magnetizable material with a pair of rotor halves mounted at opposite ends thereof, each rotor half having a side disc with multiple outwardly-directed circumferentially-spaced slots therein forming multiple circumferentially-spaced outwardly-extending arms, each rotor half having circumferentially-spaced paraxial electrodes extending from the outer ends of said arms toward aligned corresponding electrodes on the other rotor half, the adjacent ends of each pair of aligned electrodes of said rotor halves being separated by a gap, and a uni-directional current flow regulator comprising an alternating-current rectifier disposed therein; a pair of current collectors insulatedly mounted on said shaft, each collector being electrically connected to one of said rotor halves, and means engageable with said collectors for conducting electric current to and from said collectors.

5. A dynamo-electric machine comprising an interrupted-circle field magnet structure having an arcuate field magnet assembly of one polarity arrangement with its opposite ends spaced apart from one another and having an isolated field magnet of opposite polarity arrangement with respect to said field magnet assembly disposed in the space between the ends thereof, a shaft with a rotor thereon rotatably mounted within said structure with the rotor periphery disposed in proximity thereto and traversing the magnetic field thereof; said rotor having a core of magnetizable material with a pair of rotor halves mounted at opposite ends thereof, each rotor half having a side disc with multiple outwardly-directed circumferentially-spaced slots therein forming multiple circumferentially-spaced outwardly-extending arms, each rotor half having circumferentially-spaced paraxial electrodes extending from the outer ends of said arms toward aligned corresponding electrodes on the other rotor half, the adjacent ends of each pair of aligned electrodes of said rotor halves being separated by a gap, and a uni-directional current flow regulator disposed therein; a pair of current collectors insulatedly mounted on said shaft, each collector being electrically connected to one of said rotor halves, and means engageable with said collectors for conducting electric current to and from said collectors, said slots being disposed in planes disposed obliquely to the axis of rotation of said rotor wheel whereby said arms overlap although spaced apart from one another.

6. A dynamo-electric machine comprising an interrupted circle field magnet structure having an arcuate field magnet assembly of one polarity arrangement with its opposite ends spaced apart from one another and having an isolated field magnet of opposite polarity arrangement with respect to said field magnet assembly disposed in the space between the ends thereof, a shaft with a rotor thereon rotatably mounted within said structure with the rotor periphery disposed in proximity thereto and traversing the magnetic field thereof; said rotor having a core of magnetizable material with a pair of rotor halves mounted at opposite ends thereof, each motor half having a side disc with multiple outwardly-directed circumferentially-spaced slots therein forming multiple circumferentially-spaced outwardly-extending arms, each rotor half having circumferentially-spaced paraxial electrodes extending from the outer ends of said arms toward aligned corresponding electrodes on the other rotor half, the adjacent ends of each pair of aligned electrodes of said rotor halves being separated by a gap, and a uni-directional current flow regulator disposed therein; a pair of current collectors insulatedly mounted on said shaft, each collector being electrically connected to one of said rotor halves, and means engageable with said collectors for conducting electric current to and from said collectors, said slots diverging substantially radially from the central portions of said discs.

7. A dynamo-electric machine comprising an interrupted circle field magnet structure having an arcuate field magnet assembly of one polarity arrangement with its opposite ends spaced apart from one another and having an isolated field magnet of opposite polarity arrangement with respect to said field magnet assembly disposed in the space between the ends thereof, a shaft with a rotor thereon rotatably mounted within said structure with the rotor periphery disposed in proximity thereto and traversing the magnetic field thereof; said rotor having a core of magnetizable material with a pair of rotor halves mounted at opposite ends thereof; each rotor half having a side disc with multiple outwardly-directed circumferentially-spaced slots therein forming multiple circumferentially-spaced outwardly-extending arms, each rotor half having circumferentially-spaced paraxial electrodes extending from the outer ends of said arms toward aligned corresponding electrodes on the other rotor half, the adjacent ends of each pair of aligned electrodes of said rotor halves being separated by a gap, and a uni-directional current flow regulator disposed therein; a pair of current collectors insulatedly mounted on said shaft, each collector being electrically connected to one of said rotor halves, and means engageable with said collectors for conducting electric current to and from said collectors, said slots diverging substantially radially from the central portions of said discs, said slots being disposed in planes disposed obliquely to the axis of rotation of said rotor whereby said arms overlap although spaced apart from one another.

8. A dynamo-electric machine comprising an interrupted-circle field magnet structure having a permanently-magnetic arcuate field magnet assembly of one polarity arrangement with its opposite ends spaced apart from one another and having an isolated field magnet of opposite polarity arrangement with respect to said field magnet assembly disposed in the space between the ends thereof, a shaft with a rotor thereon rotatably mounted within said structure with the rotor periphery disposed in proximity thereto and traversing the magnetic field thereof; said rotor having a core of magnetizable material with a pair of rotor halves mounted at opposite ends thereof, each rotor half having a side disc with multiple outwardly-directed circumferentially-spaced slots therein forming multiple circumferentially-spaced outwardly-extending arms, each rotor half having circumferentially-spaced paraxial electrodes extending from the outer ends of said arms toward aligned corresponding electrodes on the other rotor half, the adjacent ends of each pair of aligned electrodes of said rotor halves being separated by a gap, and a uni-directional current flow regulator disposed therein; a pair of current collectors insulatedly mounted on said shaft, each collector being electrically connected to one of said rotor halves, and means engageable with said collectors for conducting electric current to and from said collectors.

9. A dynamo-electric machine comprising an interrupted-circle field magnet structure having an arcuate field magnet assembly of one polarity arrangement with its opposite ends spaced apart from one another and having a permanently magnetic isolated field magnet of opposite polarity arrangement with respect to said field magnet assembly disposed in the space between the ends thereof, a shaft with a rotor thereon rotatably mounted within said structure with the rotor periphery disposed in proximity thereto and traversing the magnetic field thereof; said rotor having a core of magnetizable material with a pair of rotor halves mounted at opposite ends thereof, each rotor half having a side disc with multiple outwardly-directed circumferentially-spaced slots therein forming multiple circumferentially-spaced outwardly-extending arms, each rotor half having circumferentially-spaced paraxial electrodes extending from the outer ends of said arms toward aligned corresponding electrodes on the other rotor half, the adjacent ends of each pair of aligned electrodes of said rotor halves being separated by a gap, and a uni-directional current flow regulator disposed therein; a pair of current collectors insulatedly mounted on said shaft, each collector being electrically connected to one of said rotor halves, and means engageable with said collectors for conducting electric current to and from said collectors.

10. A dynamo-electric machine comprising an interrupted circle field magnet structure having a permanently magnetic arcuate field magnet assembly of one polarity arrangement with its opposite ends spaced apart from one another and having a permanently magnetic isolated field magnet of opposite polarity arrangement with respect to said field magnet assembly disposed in the space between the ends thereof, a shaft with a rotor thereon rotatably mounted within said structure with the rotor periphery disposed in proximity thereto and traversing the magnetic field thereof; said rotor having a core of magnetizable material with a pair of rotor halves mounted at opposite ends thereof, each rotor half having a side disc with multiple outwardly-directed circumferentially-spaced slots therein forming mutiple circumferentially-spaced outwardly-extending arms, each rotor half having circumferentially-spaced paraxial electrodes extending from the outer ends of said arms toward aligned corresponding electrodes on the other rotor half, the adjacent ends of each pair of aligned electrodes of said rotor halves being separated by a gap, and a uni-directional current flow regulator disposed therein; a pair of current collectors insulatedly mounted on said shaft, each collector being electrically connected to one of said rotor halves, and means engageable with said collectors for conducting electric current to and from said collectors.

11. A dynamo-electric machine comprising an interrupted circle field magnet structure having an arcuate field magnet assembly of one polarity arrangement with its opposite ends spaced apart from one another and having an isolated field magnet of opposite polarity arrangement with respect to said field magnet assembly disposed in the space between the ends thereof, said isolated field magnet having an energizable winding thereon, a shaft with a rotor thereon rotatably mounted within said structure with the rotor periphery disposed in proximity thereto and traversing the magnetic field thereof; said rotor having a core of magnetizable material with a pair of rotor halves mounted at opposite ends thereof, each rotor half having a side disc with multiple outwardly-directed circumferentially-spaced slots therein forming multiple circumferentially-spaced outwardly-extending arms, each rotor half having circumferentially-spaced paraxial electrodes extending from the outer ends of said arms toward aligned corresponding electrodes on the other rotor half, the adjacent ends of each pair of aligned electrodes of said rotor halves being separated by a gap, and a uni-directional current flow regulator disposed therein; a pair of current collectors insulatedly mounted on said shaft, each collector being electrically connected to one of said rotor halves, and means engageable with said collectors for conducting electric current to and from said collectors.

12. A dynamo-electric machine comprising an interrupted-circle field magnet structure having an arcuate field magnet assembly of one polarity arrangement with its opposite ends spaced apart from one another and having an isolated field magnet of opposite polarity arrangement with respect to said field magnet assembly disposed in the space between the ends thereof, a shaft with a rotor thereon rotatably mounted within said structure with the rotor periphery disposed in proximity thereto and traversing the magnetic field thereof; said rotor having an approximately cylindrical core of magnetizable material with a pair of rotor halves mounted at opposite ends thereof, each rotor half having a side disc with multiple outwardly-directed circumferentially-spaced slots therein forming multiple circumferentially-spaced outwardly-extending arms, each rotor half having circumferentially-spaced paraxial electrodes extending from the outer ends of said arms toward aligned corresponding electrodes on the other rotor half, the adjacent ends of each pair of aligned electrodes of said rotor halves being separated by a gap, and a uni-directional current flow regulator disposed therein; a pair of current collectors insulatedly mounted on said shaft, each collector being electrically connected to one of said rotor halves, and means engageable with said collectors for conducting electric current to and from said collectors.

References Cited in the file of this patent

College Physics, Kimball, Henry Holt Co., New York, 1911, page 532.